July 15, 1930.  F. W. SCHOTT  1,770,584
ANIMAL TRAP
Filed Oct. 5, 1928
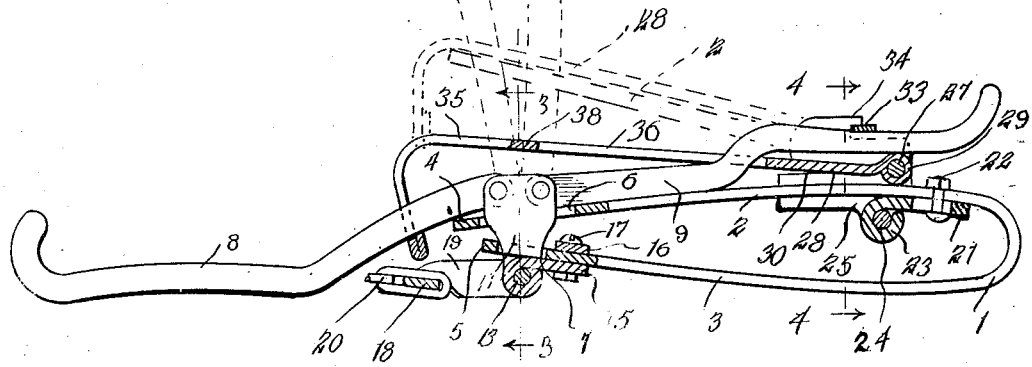
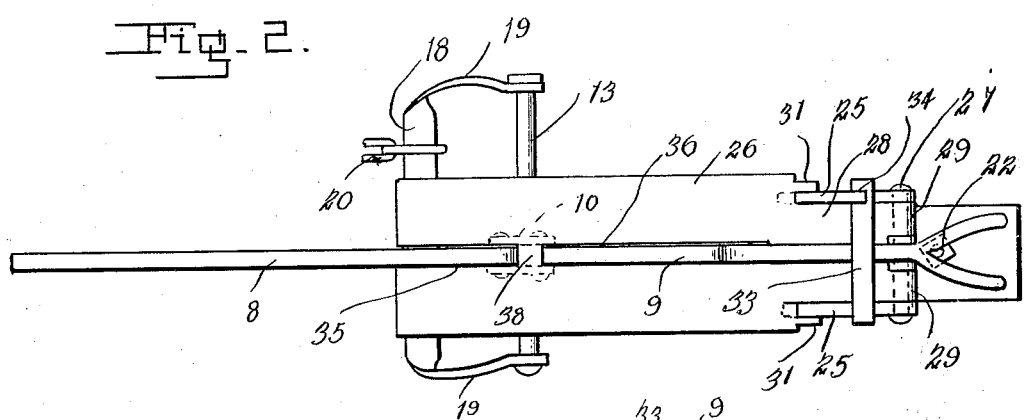
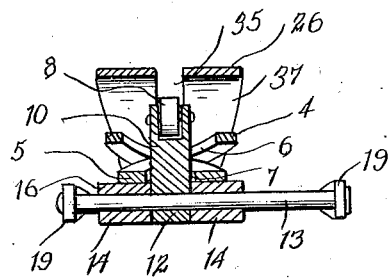
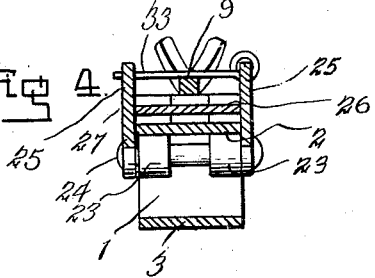
Inventor
F. W. Schott
By Lacey Lacey, Attorneys Patented July 15, 1930

1,770,584

UNITED STATES PATENT OFFICE

FREDERICK W. SCHOTT, OF LOLO HOT SPRINGS, MONTANA

ANIMAL TRAP

Application filed October 5, 1928. Serial No. 310,534.

This invention relates to fishing and trapping and more particularly to an animal-catching trap of the type disclosed in my prior Patent, No. 1,514,994, issued November 11, 1924, and over which the trap disclosed in the accompanying drawing constitutes an improvement.

One object of the invention is to provide improved means for mounting the jaws between which a leg or other portion of an animal is to be caught and to allow a bracket with which the jaw mounting is connected to serve not only as means for carrying the jaw mounting but also serve as means for carrying a shackle through the medium of which the trap may be secured.

Another object of the invention is to allow the shackle to be adjusted transversely of the trap and thereby allow the trap to be placed in a convenient location for catching an animal and the shackle secured by a staple to a tree stump or the like.

Another object of the invention is to provide improved means for supporting a latch through the medium of which the jaws are retained open and also to provide the latch-carrying means with a treadle firmly secured thereto and which when depressed by an animal stepping thereon will cause the latch to be moved out of an operative position and release the jaws.

The invention is illustrated in the accompanying drawing, wherein—

Figure 1 is a view partially in side elevation and partially in longitudinal section and showing the trap in a set position, the dotted lines showing the jaws moved to a closed position;

Fig. 2 is a top plan view of the improved trap;

Fig. 3 is a transverse sectional view through the trap taken on the line 3—3 of Fig. 1, and Fig. 4 is a transverse sectional view taken on the line 4—4 of Fig. 1.

The improved trap includes a spring 1 formed from a strip of steel or other strong resilient metal and this spring strip is bent intermediate its length to provide upper and lower leaves 2 and 3 which are normally spaced well away from each other, as indicated by dotted lines in Fig. 1, but may be forced toward each other, as shown in full lines, when the trap is set. At their free ends the leaves 2 and 3 are enlarged to provide heads 4 and 5 having openings 6 and 7 formed therein. The jaws 8 and 9 are pivotally connected with a bearing or mounting 10 which bearing is formed with a shank 11 extending downwardly through the opening 7 and having its lower end formed with a transverse eye 12 to receive a pin 13 carried by the hinge ears 14 of a bearing bracket 15. This bearing bracket 15 fits against the under surface of the lower spring leaf 3 with its side portions projecting therefrom, and in order to secure the bearing bracket against the lower spring leaf, there has been provided a strip or plate 16 which extends transversely across the upper surface of the spring leaf with its end portions projecting transversely therefrom and carrying securing bolts 17. The securing bolts 17 pass through side portions of the bearing bracket 15 and when tightened serve to very firmly retain the bearing bracket in place. By referring to Figs. 2 and 3, it will be seen that the pin 13 which serves to pivotally mount the bearing or jaw mounting 10 is of such length that it projects from opposite sides of the bearing bracket an appreciable extent. A shackle 18 has its arms 19 loosely engaged with the extended end portions of the pin 13, and this shackle may carry a chain 20 or the shackle may be directly secured to a tree stump or the like by staples or other suitable securing means. Since the pin is elongated, it may be driven through the eye 12 and hinge ears 14 and thereby allow the shackle to be shifted transversely to such a position that it may be conveniently secured to a tree root or stump when the trap is set and it is desired to place it near a root or the like without the root interfering with proper placement of the trap. The opening 6 is of sufficient size to allow the mounting 10 to project upwardly through it when the trap is set, as shown in Fig. 1, and, therefore, the jaws may be swung from an upright position, indicated by dotted lines in Fig. 1, to a substantially horizontal position when set with the jaw 8 projecting forwardly and the jaw 9 extending rearwardly over the spring.

The means for releasably securing the jaws in a set position includes a bearing bracket 21 which is secured against the under surface of the spring leaf 2 adjacent its rear end by a bolt 22 and this bracket carries hinge ears 23 through which extends a pin 24. The ends of the pin project from opposite sides of the upper spring leaf and are secured in openings formed in the lower portions of the side plates 25 of a yoke which serves as a carrier for a treadle or strip 26. These side plates extend upwardly above the spring leaf at opposite sides thereof and above the spring leaf their rear portions are joined by a pin 27, and from an inspection of Figs. 1 and 2 it will be seen that the treadle has its rear portion reduced in width to provide a tongue 28 which extends between the side plates of the yoke and terminates in arms 29 tightly secured about the pin 27. It should also be noted that at opposite sides of the tongue 28 the treadle is formed with shoulders received in notches or recesses 30 formed in the forward ends of the side plates and short tongues 31 project from the shoulders and overlap the outer surfaces of the side plates. Therefore, the treadle will be very firmly secured to the side plates and pin of the yoke and the treadle and yoke will have pivotal movement as a unit about the pin 24. A latch 33 is loosely engaged in an opening formed in one side plate and is of such length that it may extend across the bridge and have its free end portion engaged beneath a bill 34 formed upon the other side plate. Slots 35 and 36 are formed longitudinally in the treadle so that the jaws may pass through the treadle and the slot 35 extends into the down-turned free end portion 37 of the treadle, as clearly shown in Fig. 1, so that, when the treadle and the upper leaf of the spring have been forced downwardly to such a position that the mounting 10 projects upwardly through the opening 6 in the upper spring leaf, the jaw 8 may swing downwardly and rest upon the ground in front of the trap while the jaw 9 is swung rearwardly to a lowered position with its free end portion extending between the side plates of the yoke. After the jaws have been swung downwardly to a set position, the latch 33 is moved across the jaw 9 and engaged with the bill 34. In order to properly engage the latch with the bill, it is necessary to raise the treadle slightly to the position shown in full lines in Fig. 1 and when the latch is engaged with the bill the pressure of the jaw 9 against the latch will cause the latch to be frictionally held in engagement with the bill until an animal steps upon the treadle and exerts downward pressure which will cause the bill to move out of engagement with the latch. The slots 35 and 36 are separated by an unbroken portion 38 of the treadle which is disposed above the mounting 10 so that bait may be secured to the treadle by a wire passed about this unbroken portion 38. Therefore, bait may be firmly secured to the treadle in order to attract animals which it is desired to catch.

When the trap is in use and it is desired to set the same, pressure is exerted against the free end portion of the treadle until the upper spring leaf has been forced downwardly a sufficient distance to cause the jaw mounting 10 to extend upwardly through the opening 6. The jaws are swung downwardly to the position shown in Fig. 1 and the latch swung across the jaw 9, after which the treadle is raised slightly so that the bill 34 may be engaged with the free end portion of the latch. The jaw 9 is then released and the upward pressure exerted thereby against the latch will cause the latch to be frictionally held in engagement with the bill. If bait is to be used, it may be secured to the treadle either before or after the latch has been engaged with the bill but care should be taken not to allow the jaws to spring shut while applying the bait. After the jaws have been secured in an open position, the trap may be set in place and secured either by its chain or through the medium of a staple engaged with the shackle and driven into a convenient tree root or the like. When an animal steps upon the treadle, the treadle will be swung downwardly about the pin 24 and as it swings downwardly the bill will move out of engagement with the latch which is held relatively stationary by the pressure exerted thereon and as soon as the bill moves out of engagement with the latch the jaw 9 will be released and this jaw together with the jaw 8 will be swung upwardly toward a closed position by the expanding spring until the jaws close upon the animal's leg and firmly grip it.

Having thus described the invention, I claim:

1. In a trap, a spring having upper and lower leaves, the upper leaf having an opening in its free outer end, a bracket carried by the lower leaf, a bearing carried by said bracket and extending upwardly for passage through the opening in the upper leaf, jaws pivoted to said bearing and extending upwardly through the opening in the upper leaf, a yoke straddling the inner end portion of said upper leaf and pivotally connected therewith, a treadle extending forwardly from said yoke over the upper leaf and slotted longitudinally to receive said jaws, the jaws when set extending longitudinally of the upper leaf with one overlying said yoke, and a latch pivoted to one side of said yoke and adapted to extend across the said jaw when the trap is set, a keeper being provided at the other side of the yoke to engage said latch.

2. In a trap, a spring having upper and lower leaves, the upper leaf having an opening in its free outer end, a bearing bracket carried by the inner end portion of said upper leaf, a mounting pivoted to said bracket, a treadle extending from said mounting above said upper leaf and slotted longitudinally, a latch carried by said mounting, a bearing connected with the lower leaf beneath the opening in the upper leaf and adapted to pass through the opening when the upper leaf is forced towards the lower leaf in setting the trap, and jaws pivoted to said bearing and extending upwardly through the opening and through the slotted treadle and adapted to be swung downwardly and one engaged by said latch when the trap is set.

3. In a trap, a spring having upper and lower leaves, a bracket carried by said lower leaf adjacent its free end and having hinge ears, a bearing having a perforated shank fitted between the ears of said bracket, a pin passed through the ears and shank with its ends projecting, a shackle engaged with the ends of said pin, the pin being slidable longitudinally to adjust said shackle transversely, jaws pivoted to said bearing and extending upwardly through the upper leaf, the upper leaf engaging said jaws to yieldably retain the same closed and exert upward pressure thereon to pull upon said bearing and bind the pin in a set position, a mounting connected with the inner portion of said upper leaf, a treadle extending from said mounting above the upper leaf and slotted to receive said jaws whereby the jaws may be swung downwardly to an open position, and a latch carried by said mounting to engage one jaw and releasably hold the jaws open.

4. In a trap, a spring having upper and lower leaves, a bracket carried by said lower leaf adjacent its free end and having hinge ears, a bearing having a perforated shank fitted between the ears of said bracket, a pin passed through the ears and shank with its ends projecting, a shackle engaged with the ends of said pin, the pin being slidable longitudinally to adjust said shackle transversely, jaws pivoted to said bearing and extending upwardly through the upper leaf, the upper leaf engaging said jaws to yieldably retain the same closed and exert upward pressure thereon to pull upon said bearing and bind the pin in a set position, and means carried by the upper leaf to engage one jaw and releasably retain the jaws open.

5. In a trap, a spring having upper and lower leaves, the upper leaf having an opening in its free outer end, jaws pivotally connected with the outer end portion of the lower leaf and extending upwardly through the opening in the upper leaf, a bearing bracket secured to the inner end portion of said upper leaf, a yoke pivoted to said bracket and having side plates extending upwardly at opposite sides of the upper leaf and having notches in their forward portions, a pin extending across the upper leaf and joining the rear portions of said plates, a treadle extending longitudinally over the upper leaf and having its rear end portion fitted into said notches and extending between said plates and engaged with said pin, the jaws being adapted to be swung downwardly to an open position with one extending between the side plates above the treadle, and a latch adapted to extend across the last-mentioned jaw and releasably retain the jaws open.

6. In a trap, a spring having upper and lower leaves, the upper leaf having an opening adjacent its free outer end, a bearing connected with the lower leaf and extending upwardly therefrom for passage through the opening in the upper leaf, a hinge bracket secured against the under face of the upper leaf adjacent the inner end thereof, a yoke pivoted to said hinge bracket and having side plates extending upwardly at opposite sides of the upper leaf, a latch pivoted to one side plate, the other side plate having a bill to releasably engage the free end of the latch, a treadle secured to said side plates and extending longitudinally over the upper leaf with its free end projecting beyond the upper leaf and bent downwardly, the treadle having longitudinally extending slots terminating in spaced relation to each other above the opening in the upper leaf, and jaws pivoted to said bearing and extending upwardly through the opening in the upper leaf and through the slots in said treadle.

In testimony whereof I affix my signature.

FREDERICK W. SCHOTT. [L. S.]